Sept. 25, 1951  I. A. PEARL  2,568,760
FILTER FOR ULTRAVIOLET RADIATIONS
Filed Oct. 21, 1947
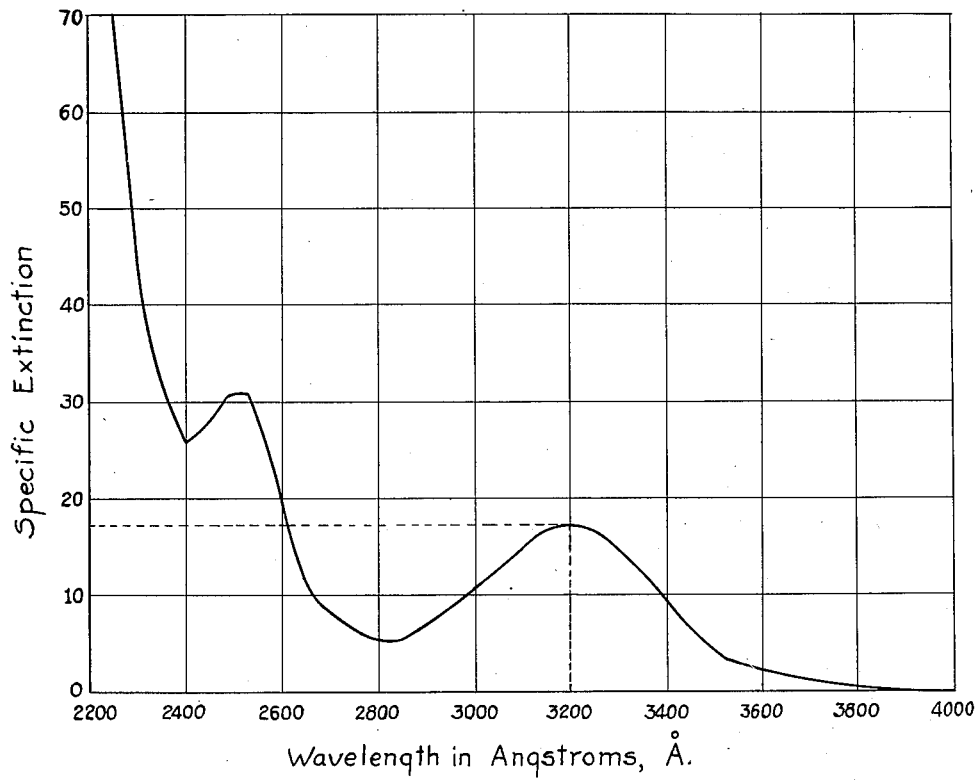
Ethyl Ester of 2-Hydroxy-3-Methoxy
Benzoic Acid (Ortho-vanillic acid)
Inventor
Irwin A. Pearl
By: Soans, Pond & Anderson
Attys Patented Sept. 25, 1951

2,568,760

UNITED STATES PATENT OFFICE 2,568,760

FILTER FOR ULTRAVIOLET RADIATIONS

Irwin A. Pearl, Appleton, Wis., assignor, by mesne assignments, to Sulphite Products Corporation, Appleton, Wis., a corporation of Wisconsin Application October 21, 1947, Serial No. 781,166

11 Claims. (Cl. 117—138.8)

The present invention provides articles and products substantially impervious to ultraviolet radiations having a wave length less than about 3600 Å. A particularly efficient extinction of ultraviolet is obtained as a consequence of my invention in the range of about 3000 to 3400 Å.

Various means have been proposed for shielding organic products from the so-called "near ultraviolet," and in particular from ultraviolet radiation of the wave length of 3650 angstrom units (Å.). Little or no attention has been devoted to the "far ultraviolet" or shorter waved radiations. However, organic products are deleteriously affected by "far ultraviolet," which term will be used herein to designate radiations having wave lengths below about 3600 Å. "Far ultraviolet" is generated by electric discharge devices, as for example, by discharges in gases or vapors in such devices as fluorescent lamps. Although short wave ultraviolet may be excluded to a substantial extent by the container walls, even a very small component of transmitted far ultraviolet in time will do considerable harm. The sunlight content of far ultraviolet falls off rapidly in wave length below 3200 Å. due to the shielding of the atmosphere. However, long-continued impact of sunlight on products susceptible to chemical change by ultraviolet of wave length as short or shorter than 3100 Å. will produce marked effects even though ultraviolet of longer wave lengths have been intercepted by filters. It has been found, for example, that newsprint paper containing ground wood pulp is rapidly depreciated by ultraviolet in the wave length range of about 2800 to 3100 Å. Other organic products including foodstuffs and especially products containing fats and oils are similarly affected. Butter is particularly vulnerable to depreciation by far ultraviolet.

It is well established that sunburn results from exposure to natural sunlight when the ultraviolet energy in the spectral range is approximately 2900 to 3200 Å. and more particularly 2967 Å. It is not purely a hot weather phenomenon, but may occur in winter in high elevations in bright sun since the snow and ice will reflect the burning rays as intensely as water or sand. Furthermore, sunburn is more likely to occur at high altitudes because of the greater intensity of ultraviolet radiation. The erythema or reddening of the skin produced by the sun's rays is especially pronounced at the mountains and the seashore because the normal spectral composition of light is disturbed and actinic rays predominate over heat rays. Actinic rays facilitate the absorption of the irritating substances which the influence of light produces.

I have discovered that ortho-vanillates, that is, esters of benzoic acid in which the phenyl ring is substituted in the 2-position by a hydroxy group and in the 3-position by a methoxy group, have a marked extinguishing or screening effect on ultraviolet radiations below about 3600 Å., and in particular in the range of 3400 to 3000 Å. wave length. I have also discovered that the esters of 2-hydroxy-3-methoxy-benzoic acid are compatible with film-forming compositions of various types and due to their substantial freedom from toxic effects, that they are particularly well suited for use with foods, cosmetic preparations and the like.

My present invention comprises the combination, or association of products susceptible to ultraviolet shorter than 3600 Å. with esters of benzoic acid which are characterized by the presence of the 2-hydroxy-3-methoxy grouping. In many instances the esters are extended in bases such as plastic resin films and the like, as well as cosmetic bases, etc. In other instances a product from which short wave length ultraviolet is to be excluded is admixed, coated, or otherwise directly associated with such ester. Wood pulp which is deleteriously affected by far ultraviolet may, in accordance with my invention, be associated with such ester in the course of its manufacture into paper.

In the accompanying drawing is shown a representative graph of ultraviolet specific extinction constants over a range of wave lengths of about 2300 to 3600 Å. for ethyl 2-hydroxy-3-methoxy-benzoate (ethyl-ortho-vanillate).

In accordance with one embodiment of my invention, sheet or film material which is to be made opaque to ultraviolet having a wave length in the range of approximately 2300 to 3600 Å. has ester of ortho-vanillic acid (2-hydroxy-3-methoxy-benzoic acid) dispersed therein, or is suitably coated with such ester. Ordinarily such sheet or film material embodying my invention should be chosen to transmit light in the visible range (above 4000 Å.) and may, or may not, as desired, be made substantially opaque to ultraviolet of shorter wave lengths than the band most efficiently excluded by an ortho-vanillate ester. If ultraviolet of short wave length is to be most efficiently excluded, that is, in the range of a wave length less than about 3100 Å., the sheet material is associated with one or more supplemental excluding agents, as, for example, esters of 3-methoxy-4-hydroxy-benzoic acid (vanillic acid), which are described in a copending application Serial No. 770,895, filed August 27, 1947. For example, such a mixture may contain equal amounts of vanillic and ortho-vanillic acid esters, or 25% of the vanillic and 75% of the ortho-vanillic esters. Other proportions may be used, depending on the results desired.

The 2-hydroxy-3 methoxy benzoic acid esters have a germicidal action and hence will function also to exert a preservative effect on film or sheet material which is subject to biologic or other disintegrating effects. For example, cellulosic products, such as cellulose acetate and nitrocellulose, are subject to fungus growths in tropical climates. Hence, sheet materials made of such products are benefited by the incorporation therein of the esters of 2-hydroxy-3-methoxy-benzoic acid (ortho-vanillic acid).

Another advantageous characteristic of the 2 - hydroxy - 3 - methoxy - benzoates is their plasticizing effect on products subject to embrittlement, including films as well as detached sheets. The ortho-vanillic esters in accordance with my invention are associated with such products with or without other plasticizing agents.

My present invention is applicable to transparent sheet products employed in wrapping or otherwise packaging organic products, including food products. Transparent sheet products include cellulosic material such as paper (including parchment and glassine paper), sheet products consisting of regenerated cellulose (cellophane), esters and ethers of cellulose, sheet products consisting of resins, for example, the methacrylate and Vinylite compounds, polystyrene, alkyd resins and others.

The 2-hydroxy-3-methoxy-benzoic acid esters either are wholly without odor, or possess slight pleasant odors. For wrapping products such as butter or other fats, in such sheet products, as parchment paper, substantially odorless additions of esters are advantageous.

The content of the esters in sheet or film products or other materials will vary widely with the functions desired, that is, whether only an ultraviolet excluding effect is desired, or whether also preservative and plasticizing effects are desired.

If only an ultraviolet screening effect for a given wave length is desired, the required content of ester may be calculated from the formula which defines the specific extinction, $K$.

$$\text{Specific extinction } K = \frac{1}{cd} \log_{10} \frac{I_0}{I}$$

In this formula $I_0$ is the intensity of the incident light; $I$ is the intensity of transmitted light; $c$ is the concentration of ester in parts per thousand; $d$ is the length of the light path in centimeters (i. e. thickness of the base or sheet material).

Should this formula be used for determining the amount of ethyl ortho-vanillate required to cause a 0.002″ thick cellulose nitrate film to transmit only 1% of incident ultraviolet of wave length of 3200 Å., the formula may be used in conjunction with a specific extinction curve for a specific ortho-vanillate such as shown in the drawing. In the curve of the drawing, ordinates are plotted in angstrom units of wave length and abscissae are plotted in specific extinction units.

$$\frac{I_0}{I} = \frac{100}{1} \text{ or } \log_{10} \frac{I_0}{I} = 2$$

$d = 0.002″$ or 0.005 cm.
As indicated by the curve $K = 17$
Substituting in the equation $$17 = \left(\frac{1}{0.005c}\right)(2)$$

Transposing $$c = \frac{2}{17 \times 0.005} = 23.5 \text{ parts per thousand or } 2.35\%$$

This calculation indicates that a film of nitrocellulose 0.002″ in thickness containing 2.35% of ethyl ortho-vanillate will transmit only 1% of incident light of wave length 3200 Å. Extinction of ultraviolet for other conditions, as for example, films of greater thickness or different extinguishing effect may be similarly calculated for ethyl ortho-vanillate or by the curves plotted for other ortho-vanillates.

In the production of sheet material embodying my invention the esters may be introduced by direct solution into the composition of the sheet material or by solution in a solvent which is suitable for addition to the sheet material, as, for example, in a plasticizer consisting of a high boiling ester.

The following examples are to be considered as illustrative and not as limiting.

EXAMPLE I

A lacquer for moistureproofing regenerated cellulose (cellophane) sheets is prepared from the following ingredients in which the "parts" represent parts by weight.

| | Parts |
|---|---|
| Nitrocellulose | 6.70 |
| Paraffin wax | 0.15 |
| Dammar | 1.50 |
| Dibutylphthalate | 2.90 |
| Acetone | 1.45 |
| Ethanol | 2.90 |
| Toluene | 33.10 |
| Ethyl acetate | 51.00 |
| Water | 0.30 |
| Ethyl ortho-vanillate | 0.27 |

The ortho-vanillate is mixed with the dibutylphthalate and compounded into the lacquer in accordance with standard practices, such, for example, as described in Patent 2,280,829. A lacquer containing about 2.35% ethyl ortho-vanillate (based on the non-volatile constituents), as a film 0.002 inch thick will transmit only 1% incident light for a wave length of 3200 Å. This may be ascertained by use of the formula as explained above.

EXAMPLE II

A composition for preventing sunburn is prepared by mixing about 1 to 2 per cent of ethyl ortho-vanillate with a vanishing cream base. Oily bases such as mineral oil, vegetable oil, etc., may also be employed in place of the vanishing cream if desired. Preferably the anti-sunburn preparation should also contain an ester of 3 - methoxy - 4 - hydroxy - benzoic acid (vanillic acid). The ortho-vanillate and the vanillate ester may be associated in substantially equal proportions or the amount of vanillate ester may preponderate in order to most completely exclude the shorter wave length far ultraviolet.

EXAMPLE III

Parchment paper made in accordance with standard practices is treated with a warm aqueous emulsion or dispersion containing about 3 to 5% of ethyl ortho-vanillate. Preferably the paper is treated while still wet and then is subjected to the usual drying operations.

The esters of the 2-hydroxy-3-methoxy benzoic acid used in the compositions of the present invention may be prepared by various esterification processes. The following are illustrative examples.

Methyl ortho-vanillate

This product is prepared as follows: A mixture of 100 grams of ortho-vanillic acid, 400 cc. of methanol and 20 cc. of concentrated sulphuric acid are mixed and boiled under reflux condensation for about three hours. Approximately 300 cc. of methanol is removed by distillation under reduced pressure. The residue which solidifies on cooling is dissolved in ether, and washed well with a solution of saturated sodium bicarbonate. The ether is dried with anhydrous sodium sulphate and is distilled off. The residue solidifies on cooling to give 80 grams (87%) of crude methyl ortho-vanillate melting at about 57° to 58°. C. Recrystallization from petroleum ether yields white crystals melting at 64°–65° C.

Ethyl ortho-vanillate

This product is prepared in much the same way as the methyl ortho-vanillate. A mixture of 80 grams of ortho-vanillic acid, 400 cc. of 95% ethanol and 20 cc. of concentrated sulphuric acid when boiled under reflux for about four hours produces the desired compound. The excess ethanol may be removed at reduced pressure. The syrupy mixture is stirred into two liters of ice and water and neutralized with a slurry of sodium bicabonate. Upon continued stirring a crystalline precipitate separates. The mixture is extracted with ether. Upon removal of the water with anhydrous sodium sulphate and distillation on a steam bath, an oily ortho-vanillate product is obtained. Upon distillation under high vacuum a colorless oil is obtained which distills at 121° C./3 mm. and has an index of refaction of $n^{20}_D$ 1.5342.

The described processes may be used to prepare various other esters of ortho-vanillic acid with appropriate substitutions and modifications. Additional examples are:

Propyl ester

The n-propyl ortho-vanillate similarly prepared by reacting n-propyl alcohol with ortho-vanillic acid is a crystalline compound which upon being recrystallized from either petroleum ether or dilute ethanol is obtained as a crystalline produce melting at 52° C.

Butyl ester

The n-butyl ortho-vanillate is prepared in the same manner by reacting n-butyl alcohol with ortho-vanillic acid and is obtained as a colorless liquid distilling at 131° C./1.5 mm. which solidifies upon cooling to a white crystalline solid melting at 39–40° C. Recrystallization from 65–110° petroleum ether results in white rhombic plates melting at 39–40° C.

Isobutyl ester

The isobutyl ortho-vanillate is prepared in the same manner by reacting isobutyl alcohol with ortho-vanillic acid and is obtained as a colorless oil distilling at 139°C./3.5 mm. which solidifies to a white solid melting at 52–53° C.

Amyl ester

The n-amyl ortho-vanillate is prepared in the same manner by reacting n-amyl alcohol with ortho-vanillic acid and is obtained as white crystals melting at 55–56° C.

Isoamyl ester

The isoamyl ortho-vanillate is prepared in the same manner by reacting isoamyl alcohol with ortho-vanillic acid and is obtained as a colorless oil distilling at 147° C./2 mm. to 156° C./4 mm. and having a refractive index $n_D^{27}$ 1.5160.

2-ethylbutyl ester

The 2-ethylbutyl ortho-vanillate is prepared in the same manner by reacting 2-ethylbutyl alcohol with ortho-vanillic acid and is obtained as a colorless liquid distilling at 144° C./2 mm. and having a refractive index $n_D^{22}$ 1.5174.

Cellosolve ester

The Cellosolve ortho-vanillate (2-ethoxyethyl ortho-vanillate) is prepared in the same manner by reacting Cellosolve with ortho-vanillic acid. It is obtained as a colorless liquid, distilling at 157–163° C./4 mm., which solidifies on cooling to a crystalline solid melting at 30° C. Recrystallization from petroleum ether yields white rhombic crystals melting at 31° C.

Phenyl Cellosolve ester

The phenyl Cellosolve ortho-vanillate (2-phenoxyethyl ortho-vanillate) may be prepared by saturating with hydrogen chloride a mixture of 100 grams ortho-vanillic acid and 500 cc. of phenyl Cellosolve while heating on the steam bath for 6 hours. A crystalline solid separates from the solution. This solid is filtered and washed with water. The filtrate is distilled under reduced pressure to remove 250 cc. of excess phenyl Cellosolve. Upon cooling at this point more crystals separate. These are filtered and washed with water. The crude crystals when recrystallized from dilute ethanol and then from petroleum ether (65–110°) yield colorless crystals melting at 93° C.

Other esters including the alkyl esters such as the isopropyl, secondary butyl, diethyl carbinyl, hexyl, etc., the alkyl-Cellosolves such as the methyl and butyl Cellosolves and aralkyl esters such as the benzyl ester, may be prepared in accordance with the above processes by use of the appropriate esterifying alcohol. Polyhydric esters such as the ethylene glycol esters, aryl esters such as the phenyl ester, as well as substituted (e. g. chloro substituted) ortho-vanillates may also be employed in the present invention.

Investigations have demonstrated that the important group in the compounds used in the present invention resides in the presence or combination of adjacent methoxy and hydroxy groups, and specifically a hydroxy group and a methoxy group at the 2- and 3- positions, respectively, to the COO-group on the phenyl ring. Investigations have also demonstrated that the replacement of the H atom of the acid or carboxyl (COOH) group of the 2-hydroxy-3-methoxy-benzoic acid with an ester group results in no substantial change in the extinguishing or screening effect on ultraviolet radiations. The ester is employed in the present invention as the presence of the organic ester group makes the compounds more compatible with various bases, e. g. resins and the like, as well as substantially chemically inert under the conditions of use.

The esters are also employed as they are stable to heat and resistant to microorganisms, and are odorless or have pleasant odors. Other reasons for employing the esters are that investigations have demonstrated esters of 2-hydroxy-3-methoxy-benzoic acid to have inherent plasticizing effects which help keep flexible films flexible, that the esters remain with the film forming compositions due to their high boiling points (i. e. extremely low vapor pressures), and that esters do not cause transparent films to discolor or haze. In addition to the above, as the esters are substantially non-toxic to animals including humans, they are particularly adaptable for use in the various fields of the ultraviolet radiation art.

I claim:

1. A wrapping material substantially impervious to ultraviolet radiations in the range of about 2300 to 3600 Å., comprising a base sheet having incorporated therewith an ester of 2-hydroxy-3-methoxy-benzoic acid.

2. A wrapping material substantially impervious to ultraviolet radiations in the range of about 2300 to 3600 Å., comprising a plastic base having a coating thereon containing as an essential ingredient an ester of 2-hydroxy-3-methoxy-benzoic acid.

3. A wrapping material substantially impervious to ultraviolet radiations in the range of about 2300 to 3600 Å., comprising a cellophane base sheet coated with a water-proofing composition containing an ester of 2-hydroxy-3-methoxy-benzoic acid.

4. A cellulose base having incorporated therewith an ester of 2-hydroxy-3-methoxy-benzoic acid.

5. A paper base containing groundwood having incorporated therewith an ester of 2-hydroxy-3-methoxy-benzoic acid.

6. A cellulose base having incorporated therewith an alkyl ester of ortho-vanillic acid.

7. A cellulose base having incorporated therewith ethyl ortho-vanillate.

8. An article characterized by being substantially opaque to ultraviolet radiations in the range of about 2300 to 3600 Å., comprising a resin base having incorporated therewith an ester of 2-hydroxy-3-methoxy-benzoic acid.

9. An article characterized by being substantially opaque to ultraviolet radiations in the range of about 2300 to 3600 Å., comprising a resin base having incorporated therewith an alkyl ester of ortho-vanillic acid.

10. An article characterized by being substantially opaque to ultraviolet radiations in the range of about 2300 to 3600 Å., comprising a resin base having incorporated therewith ethyl ortho-vanillate.

11. An article characterized by being substantially opaque to ultraviolet radiations in the range of about 2300 to 3600 Å., comprising a resin base having incorporated therewith a Cellosolve ester of ortho-vanillic acid.

IRWIN A. PEARL.

REFERENCES CITED

The following references are of record in the file of this patent:

UNITED STATES PATENTS

| Number | Name | Date |
|---|---|---|
| 1,920,483 | Senftner | Aug. 1, 1933 |
| 2,267,200 | Hershberger et al. | Dec. 23, 1941 |
| 2,375,138 | Salvin et al. | May 1, 1945 |
| 2,380,043 | Hochwalt | July 10, 1945 |
| 2,383,074 | Parker | Aug. 21, 1945 |
| 2,418,695 | Brown | Apr. 8, 1947 |

FOREIGN PATENTS

| Number | Country | Date |
|---|---|---|
| 474,666 | Great Britain | Nov. 1, 1937 |

OTHER REFERENCES

Fritsch: Liebigs Annalen, vol. 301, page 355 (1898).

Goodman: Cosmetic Dermatology (1936), page 525.

Food Industries, vol. 17 (1945), pp. 1173, 1458-61, 1600, 1602, 1604.

Pearl: Chemical Abstracts, vol. 40, page 1945 (April 1946).